(12) United States Patent
Pandev et al.

(10) Patent No.: US 12,523,968 B2
(45) Date of Patent: Jan. 13, 2026

(54) SYSTEM AND METHOD FOR ESTIMATING MEASUREMENT UNCERTAINTY FOR CHARACTERIZATION SYSTEMS

(71) Applicant: KLA Corporation, Milpitas, CA (US)

(72) Inventors: Stilian Pandev, Santa Clara, CA (US); Min-Yeong Moon, Ann Arbor, MI (US)

(73) Assignee: KLA Corporation, Milpitas, CA (US)

( * ) Notice: Subject to any disclaimer, the term of this patent is extended or adjusted under 35 U.S.C. 154(b) by 347 days.

(21) Appl. No.: 18/081,191

(22) Filed: Dec. 14, 2022

(65) Prior Publication Data

US 2024/0201637 A1 Jun. 20, 2024

(51) Int. Cl.
*G05B 13/02* (2006.01)

(52) U.S. Cl.
CPC ................ *G05B 13/0265* (2013.01)

(58) Field of Classification Search
None
See application file for complete search history.

(56) References Cited

U.S. PATENT DOCUMENTS

| | | | | |
|---|---|---|---|---|
| 5,608,526 | A * | 3/1997 | Piwonka-Corle | G01N 21/211 356/73 |
| 5,859,424 | A | 1/1999 | Norton et al. | |
| 6,429,943 | B1 | 8/2002 | Opsal et al. | |
| 7,478,019 | B2 * | 1/2009 | Zangooie | G01B 11/0625 703/2 |
| 7,933,026 | B2 * | 4/2011 | Opsal | G01B 11/0641 356/369 |
| 9,291,554 | B2 * | 3/2016 | Kuznetsov | G01N 21/95607 |
| 9,336,483 | B1 * | 5/2016 | Abeysooriya | G06N 3/082 |
| 9,470,986 | B2 | 10/2016 | Fuchs et al. | |

(Continued)

FOREIGN PATENT DOCUMENTS

| | | |
|---|---|---|
| WO | 2014062972 A1 | 4/2014 |
| WO | 2014100037 A1 | 6/2014 |
| WO | 2014123907 A1 | 8/2014 |

OTHER PUBLICATIONS

Korean Intellectual Property Office, International Search Report and Written Opinion received in International Application No. PCT/US2023/082617, Apr. 8, 2024, 7 pages.

*Primary Examiner* — Hua Lu
(74) *Attorney, Agent, or Firm* — Suiter Swantz IP

(57) ABSTRACT

A characterization system is disclosed. The system may include one or more controllers including one or more processors configured to execute a set of program instructions stored in memory. The controller may be configured to train a machine learning-based characterization library based on a set of training data. The controller may be configured to generate one or more characterization measurements using the trained machine learning-based characterization library based on the real-time characterization data associated with the one or more samples from the characterization sub-system. The controller may be configured to determine one or more additional characterization measurements based on a non-machine learning-based technique. The controller may be configured to compare the one or more characterization measurements and the one or more additional characterization measurements to monitor a measurement uncertainty of the machine learning-based characterization library.

31 Claims, 9 Drawing Sheets

(56) References Cited

U.S. PATENT DOCUMENTS

| | | |
|---|---|---|
| 9,581,430 B2 | 2/2017 | Manassen et al. |
| 9,739,702 B2 | 8/2017 | Bringoltz et al. |
| 9,915,522 B1* | 3/2018 | Jiang .................. G03F 7/70616 |
| 10,591,406 B2 | 3/2020 | Bringoltz et al. |
| 10,769,320 B2 | 9/2020 | Kuznetsov et al. |
| 2014/0071457 A1* | 3/2014 | Cai ...................... G01N 21/956 |
| | | 356/498 |
| 2014/0111791 A1* | 4/2014 | Manassen .......... G01B 9/02087 |
| | | 356/450 |
| 2014/0172394 A1* | 6/2014 | Kuznetsov .......... G03F 7/70625 |
| | | 703/6 |
| 2014/0176955 A1* | 6/2014 | Fuchs .................. G01N 21/956 |
| | | 356/448 |
| 2015/0046118 A1* | 2/2015 | Pandev ............... G03F 7/70641 |
| | | 702/155 |
| 2015/0204664 A1* | 7/2015 | Bringoltz ........... G02B 27/4255 |
| | | 356/508 |
| 2017/0307548 A1* | 10/2017 | Bykanov .................. G21K 1/04 |
| 2018/0106735 A1* | 4/2018 | Gellineau ............... G01B 15/04 |
| 2018/0164792 A1* | 6/2018 | Lin ..................... G05B 19/41875 |
| 2019/0188141 A1* | 6/2019 | Ma ........................... G06N 3/09 |
| 2019/0302039 A1* | 10/2019 | Artemiev ......... G01N 23/20008 |
| 2020/0243400 A1* | 7/2020 | Wang ................. G01N 21/9501 |
| 2020/0387789 A1* | 12/2020 | Ferguson ............. G06N 3/0499 |
| 2022/0404711 A1* | 12/2022 | Gu .......................... G03F 7/705 |
| 2024/0159656 A1* | 5/2024 | Teh ...................... G01N 21/211 |

\* cited by examiner

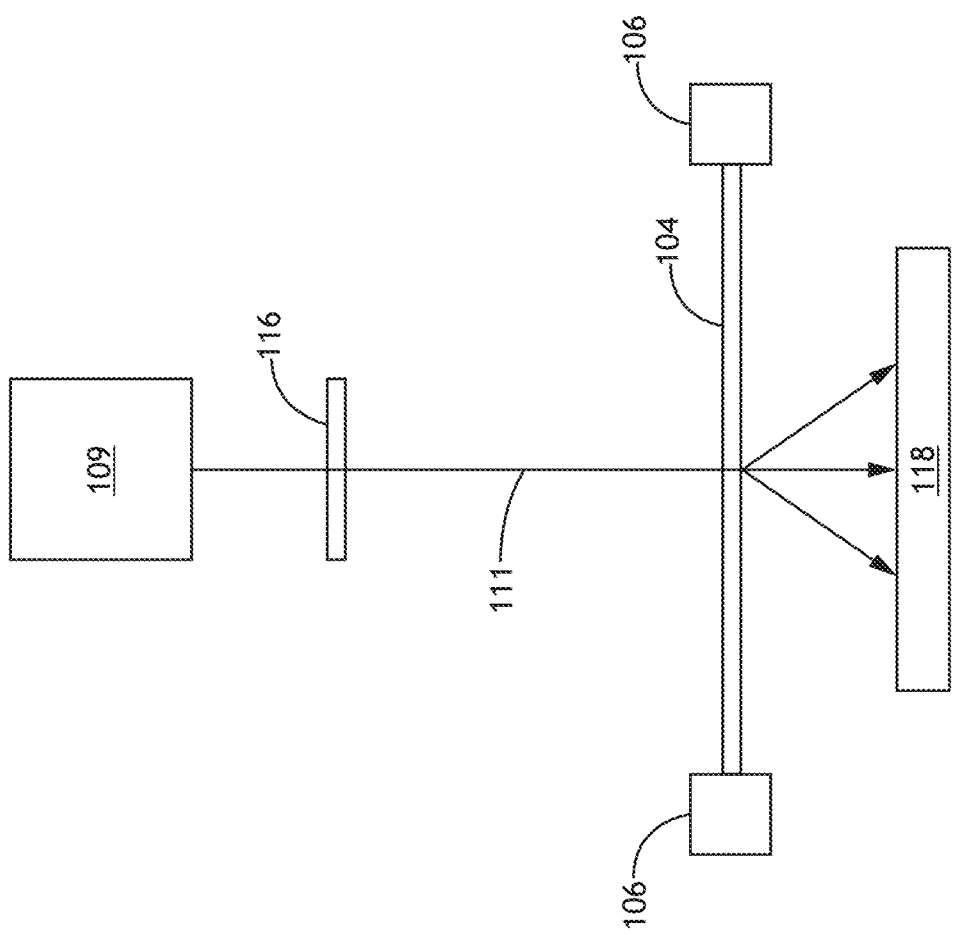

600

610

SYSTEM AND METHOD FOR ESTIMATING MEASUREMENT UNCERTAINTY FOR CHARACTERIZATION SYSTEMS

TECHNICAL FIELD

The present disclosure relates generally to characterization systems, and more particularly, to a system and method for estimating measurement uncertainty for characterization systems.

BACKGROUND

Characterization systems typically characterize (e.g., inspection or measure) a variety of characteristics of a sample. For example, metrology systems often characterize a variety of characteristics of a sample such as overlay of patterned structures on one layer of the sample with respect to patterned structures on another lay of the sample, angular tilt, and the like. As the size of the samples decreases and the sample density increases, the demands on characterization systems needed to characterize the sample increase. Various techniques have been developed to obtain sample measurement data (e.g., overlay, tilt measurements, inspection data), such techniques are generic and do not provide per parameter uncertainty estimation. For example, when the measurement is obtained using regression, the spectral fit (real and simulated spectra) can be used to estimate the uncertainty, however, this method only gives an indication of how the whole model fits the spectra and not individual parameters. In this regard, the modeled spectra may overfit the spectra where the parameter errors are large. By way of another example, where measurement is obtained using machine learning libraries, the distance from the training set may be used for uncertainty estimation, however, the distance from the training set does not always indicate large error for machine learning models that extrapolate well. Further, the method does not estimate the uncertainty per parameter. There is therefore a need to develop systems and methods to cure the above deficiencies.

SUMMARY

A characterization system is disclosed, in accordance with one or more embodiments of the present disclosure. In embodiments, the characterization system includes one or more controllers including one or more processors configured to execute a set of program instructions stored in memory. In embodiments, the set of program instructions are configured to cause the one or more processors to train a machine learning-based characterization library based on a set of training data including at least known characterization data associated with one or more samples, theoretical characterization data, and real-time characterization data associated with the one or more samples from a characterization sub-system. In embodiments, the set of program instructions are configured to cause the one or more processors to generate one or more characterization measurements using the trained machine learning-based characterization library based on the real-time characterization data associated with the one or more samples from the characterization sub-system. In embodiments, the set of program instructions are configured to cause the one or more processors to determine one or more additional characterization measurements based on a non-machine learning-based technique configured to determine the one or more additional characterization measurements based on the real-time characterization data from the characterization sub-system or additional real-time characterization data from an additional characterization sub-system. In embodiments, the set of program instructions are configured to cause the one or more processors to compare the one or more characterization measurements based on the generated machine learning-based characterization library and the one or more additional characterization measurements based on the non-machine learning-based technique to monitor a measurement uncertainty of the machine learning-based characterization library.

A characterization system is disclosed, in accordance with one or more embodiments of the present disclosure. In embodiments, the characterization system includes a characterization sub-system configured to obtain real-time characterization data of one or more samples. In embodiments, the characterization system includes one or more controllers including one or more processors configured to execute a set of program instructions stored in memory. In embodiments, the set of program instructions are configured to cause the one or more processors to train a machine learning-based characterization library based on a set of training data including at least known characterization data associated with one or more samples, theoretical characterization data, and real-time characterization data associated with the one or more samples from the characterization sub-system. In embodiments, the set of program instructions are configured to cause the one or more processors to generate one or more characterization measurements using the trained machine learning-based characterization library based on the real-time characterization data associated with the one or more samples from the characterization sub-system. In embodiments, the set of program instructions are configured to cause the one or more processors to determine one or more additional characterization measurements based on a non-machine learning-based technique configured to determine the one or more additional characterization measurements based on the real-time characterization data from the characterization sub-system or additional real-time characterization data from an additional characterization sub-system. In embodiments, the set of program instructions are configured to cause the one or more processors to compare the one or more characterization measurements based on the generated machine learning-based characterization library and the one or more additional characterization measurements based on the non-machine learning-based technique to monitor a measurement uncertainty of the machine learning-based characterization library.

A method is disclosed, in accordance with one or more embodiments of the present disclosure. In embodiments, the method includes training a machine learning-based characterization library based on a set of training data including at least known characterization data associated with one or more samples, theoretical characterization data, and real-time characterization data associated with the one or more samples from a characterization sub-system. In embodiments, the method includes generating one or more characterization measurements using the trained machine learning-based characterization library based on the real-time characterization data associated with the one or more samples from the characterization sub-system. In embodiments, the method includes determining one or more additional characterization measurements based on a non-machine learning-based technique configured to determine the one or more additional characterization measurements based on the real-time characterization data from the characterization sub-system or additional real-time characterization data from an additional characterization sub-system. In embodiments, the method includes comparing the one or more characterization measurements based on the generated machine learning-based characterization library and the one or more additional characterization measurements based on the non-machine learning-based technique to monitor a measurement uncertainty of the machine learning-based characterization library.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 1C illustrates a simplified schematic view of the characterization sub-system configured as an x-ray sub-system, in accordance with one or more embodiments of the present disclosure.

DETAILED DESCRIPTION

Figure 1A:
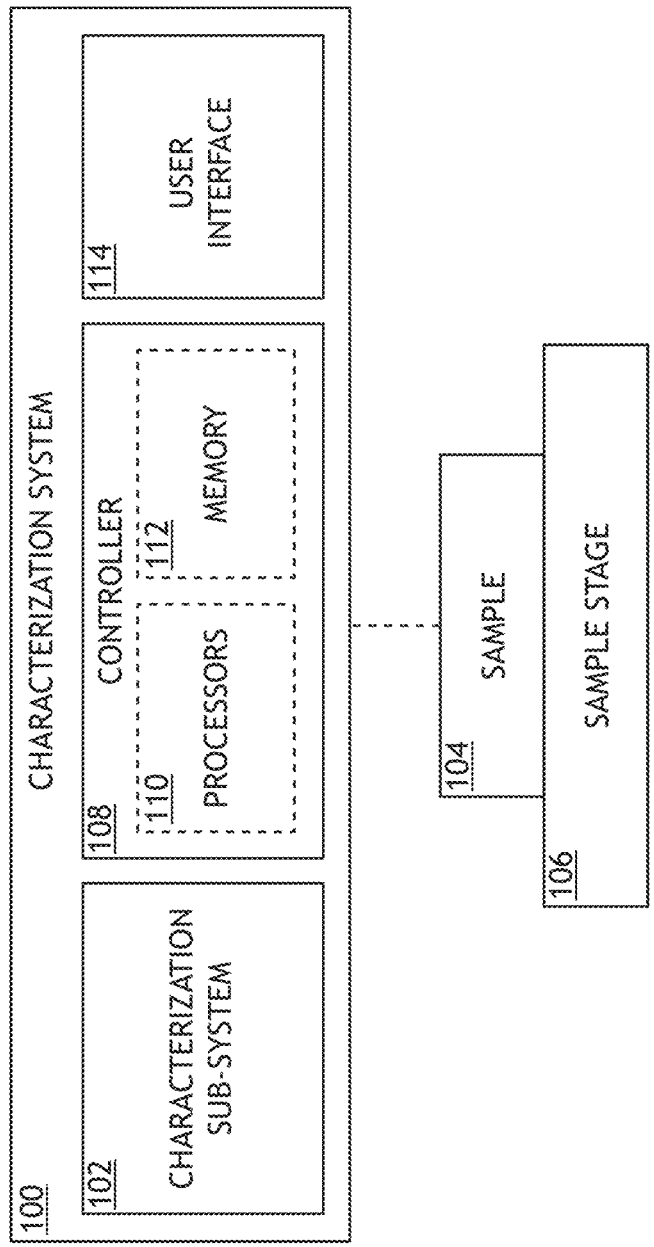
FIG. 1A illustrates a simplified schematic block diagram of a characterization system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the present disclosure.

Embodiments of the present disclosure are directed to systems and methods for estimating measurement uncertainty for characterization systems. In particular, embodiments of the present disclosure are directed to a system and method for monitoring measurement uncertainty of machine learning techniques used in machine learning-based characterization libraries. For example, the system may be configured to generate a characterization measurement using a non-machine learning-based technique based on a ground truth as the monitor of the measurement uncertainty of the machine learning technique. As an example in the case of overlay measurements, the generated overlay measurement may be generated based on an asymmetry signal, where the ground truth is that an asymmetry signal is zero when physical overlay is zero. In this regard, the generated overlay measurement based on the asymmetry signal may be compared with the overlay measurement obtained using the machine learning-based overlay library to monitor the measurement uncertainty of the machine learning technique of the overlay library. As another example in the case of tilt measurements, the generated angular tilt measurement may be generated based on an asymmetry signal or brightness per angle, where the ground truth is that an asymmetry signal is zero at the maximum intensity. In this regard, the generated overlay measurement based on the asymmetry signal may be compared with the overlay measurement obtained using the machine learning-based overlay library to monitor the measurement uncertainty of the machine learning technique of the overlay library.

For the purposes of the present disclosure, the term overlay is used to describe relative positions of features on a sample fabricated by two or more lithographic patterning steps, where the term overlay error describes a deviation of the features from a nominal arrangement. For example, a multi-layered device may include features patterned on multiple sample layers using different lithography steps for each layer, where the alignment of features between layers must typically be tightly controlled to ensure proper performance of the resulting device. Accordingly, an overlay measurement may characterize the relative positions of features on two or more of the sample layers. By way of another example, multiple lithography steps may be used to fabricate features on a single sample layer. Such techniques, commonly called double-patterning or multiple-patterning techniques, may facilitate the fabrication of highly dense features near the resolution of the lithography system. An overlay measurement in this context may characterize the relative positions of the features from the different lithography steps on this single layer. It is to be understood that examples and illustrations throughout the present disclosure relating to a particular application of overlay metrology are provided for illustrative purposes only and should not be interpreted as limiting the disclosure.

Overlay measurements may generally be performed directly on features of a fabricated device (e.g., device features) or on dedicated overlay targets printed using the same lithography steps as the device features. Overlay on device features or in-die device features may beneficially provide measurements on or near the locations of interest on the sample, but may require the use of an overlay recipe involving complex models to relate characterization data to a measurement of physical overlay. Further, the overlay recipe may need to be retrained or adjusted over time to compensate for drifts or deviations of processing equipment or sample variations. In contrast, dedicated overlay targets may generally be placed at any suitable location (e.g., in-die or in scribe lines) and may further include features with characteristics (e.g., size, density, orientation, or the like) specially designed to facilitate overlay measurements. However, a critical challenge to the use of dedicated overlay targets is ensuring that the overlay measurement generated by the dedicated overlay target accurately represents the actual overlay of the device features. A target-based overlay measurement may deviate from an actual overlay of device features for various reasons. For instance, differences in size, orientation, density, or physical location between the target features and the device features may result in fabrication deviations that manifest as systematic errors in the overlay measurement. Additionally, different overlay techniques and target designs may have different tradeoffs between size, accuracy, illumination source requirements and measurement complexity or speed.

Further, overlay measurements of the device features (e.g., the preliminary overlay measurements) may be generated using a variety of overlay recipes including, but not limited to, an overlay library. For example, an overlay recipe for generating overlay measurements from device features may include, but is not required to include, an overlay library generated by training a machine learning recipe with overlay data of device targets having known physical overlay values and associated overlay data generated by an overlay metrology sub-system (e.g., a Mueller ellipsometer, ARR, SAXS, SXR, or the like). In this way, a trained machine learning library may provide an overlay measurement of a sample with an unknown overlay value based on overlay data from the overlay sub-system.

Additional embodiments of the present disclosure are directed to a system and method for estimating angular tilt measurement uncertainty without requiring any models. For example, scatter x-ray intensity may be integrated within a region of interest for each angular position. Further, a tilt value may be calibrated based on the intensity value per angle and used a ground truth, such that it can be used to measure tilt uncertainty for tilt machine learning-based library or decide which machine learning-based library is more robust.

Referring now to FIGS. 1A-6B, systems and methods for estimating measurement uncertainty for characterization systems is described in greater detail, in accordance with one or more embodiments of the present disclosure.

FIG. 1A illustrates a simplified schematic block diagram of a characterization system 100, in accordance with one or more embodiments of the present disclosure.

In embodiments, the characterization system 100 includes a characterization sub-system 102 configurable according to a characterization recipe (e.g., inspection recipe, overlay recipe, tilt recipe, or the like) to generate characterization data associated with a characterization target on a sample 104.

In embodiments, the characterization sub-system 102 includes one or more metrology sub-systems. For example, the metrology sub-system 102 may include an overlay metrology sub-system configured to generate overlay data associated with various overlay targets distributed on a sample 104. By way of another example, the metrology sub-system 102 may include an x-ray metrology sub-system configured to generate tilt data associate with various metrology targets distributed on a sample 104.

In embodiments, the characterization sub-system 102 includes one or more inspection sub-systems. For example, the inspection sub-system 102 may include an optical inspection sub-system configured to generate optical inspection data associated with the sample 104. By way of another example, the inspection sub-system 102 may include a particle beam inspection sub-system configured to generate e-beam inspection data associated with the sample 104. By way of another example, the inspection sub-system 102 may include an x-ray inspection sub-system configured to generate x-ray inspection data associated with the sample 104.

In embodiments, the sample 104 is disposed on a sample stage 106. The sample stage 106 may include any device suitable for positioning and/or scanning the sample 104 within the characterization sub-system 102. For example, the sample stage 106 may include any combination of linear translation stages, rotational stages, tip/tilt stages, or the like. In this way, the sample stage 106 may align a selected target within a measurement field of view of the characterization sub-system 102 for a measurement.

Figure 1B:
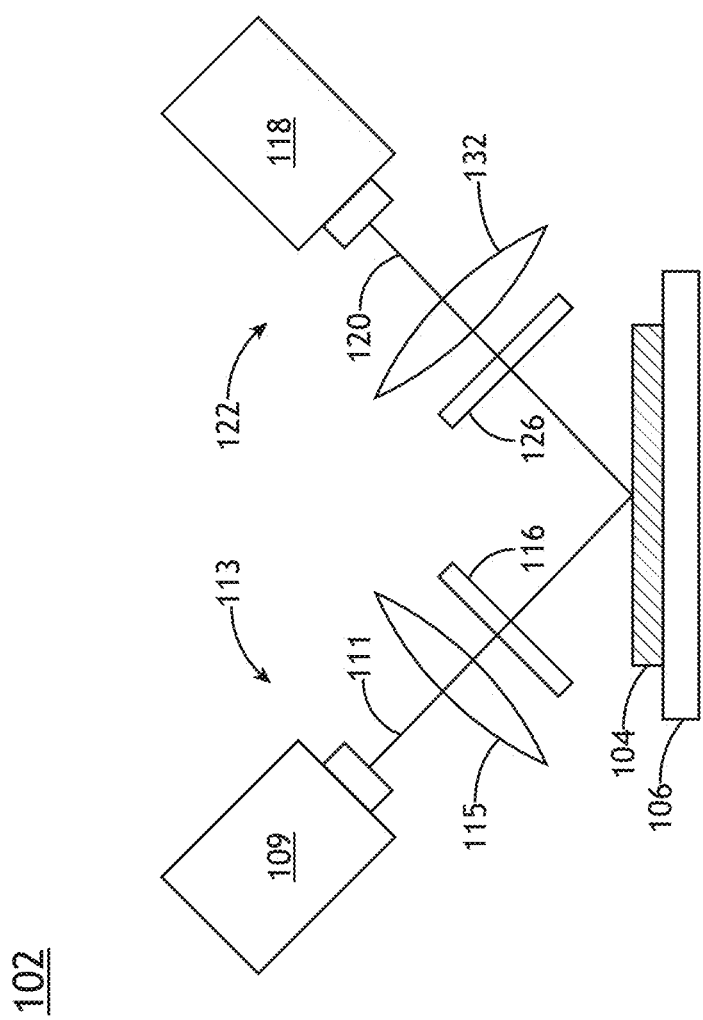
FIG. 1B illustrates a simplified schematic view of a characterization sub-system suitable for optical measurements, in accordance with one or more embodiments of the present disclosure.
Figure 1D:
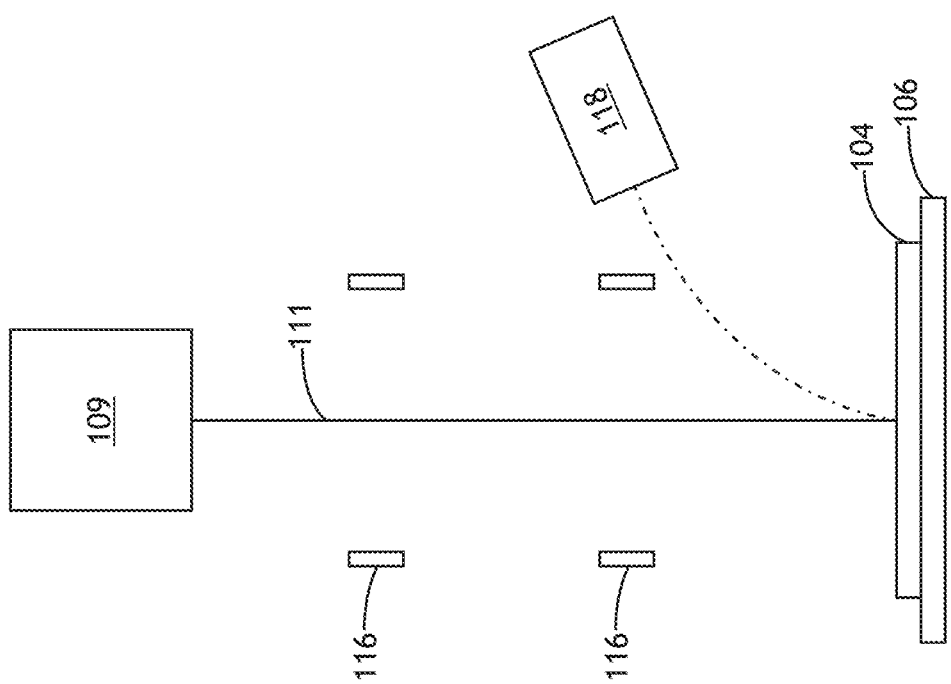
FIG. 1D illustrates a simplified schematic view of the characterization sub-system configured as a particle-beam characterization sub-system, in accordance with one or more embodiments of the present disclosure.

Referring now to FIGS. 1B-1D, various configurations of the characterization sub-system 102 are described in greater detail, in accordance with one or more embodiments of the present disclosure.

In a general sense, a characterization sub-system 102 may illuminate the sample 104 with at least one illumination beam and collect at least one measurement signal from the sample 104 in response to the illumination beam. The illumination beam may include, but is not limited to, an optical beam (e.g., a light beam) at any wavelength or range of wavelengths, an x-ray beam, an electron beam, or an ion beam. In this way, the characterization sub-system 102 may operate as an optical characterization sub-system, an x-ray characterization sub-system, an electron-beam (e.g., e-beam) characterization sub-system, or an ion beam characterization sub-system.

FIG. 1B illustrates a simplified schematic view of a characterization sub-system 102 suitable for optical measurements, in accordance with one or more embodiments of the present disclosure. For example, FIG. 1B may generally illustrate various configurations including, but not limited to, a spectroscopic ellipsometer (SE), an SE with multiple angles of illumination, an SE measuring Mueller matrix elements (e.g. using rotating compensator(s)), a single-wavelength ellipsometer, a beam profile ellipsometer (angle-resolved ellipsometer), a beam profile reflectometer (angle-resolved reflectometer), a broadband reflective spectrometer (spectroscopic reflectometer), a single-wavelength reflectometer, an angle-resolved reflectometer, an imaging system, or a scatterometer (e.g., speckle analyzer). The wavelengths for optical systems can vary from about 120 nm to 3 microns. For non-ellipsometer systems, signals collected can be polarization-resolved or unpolarized.

In embodiments, the characterization sub-system 102 includes an illumination source 109 to generate an optical illumination beam 111. The illumination beam 111 may include one or more selected wavelengths of light including, but not limited to, ultraviolet (UV) radiation, visible radiation, or infrared (IR) radiation.

The illumination source 109 may be any type of illumination source known in the art suitable for generating an optical illumination beam 111. In embodiments, the illumination source 108 includes a broadband plasma (BBP) illumination source. In this regard, the illumination beam 111 may include radiation emitted by a plasma. For example, a BBP illumination source 109 may include, but is not required to include, one or more pump sources (e.g., one or more lasers) configured to focus into the volume of a gas, causing energy to be absorbed by the gas in order to generate or sustain a plasma suitable for emitting radiation. Further, at least a portion of the plasma radiation may be utilized as the illumination beam 111.

In embodiments, the illumination source 109 may include one or more lasers. For instance, the illumination source 109 may include any laser system known in the art capable of emitting radiation in the infrared, visible, or ultraviolet portions of the electromagnetic spectrum.

The illumination source 109 may further produce an illumination beam 111 having any temporal profile. For example, the illumination source 108 may produce a continuous illumination beam 111, a pulsed illumination beam 111, or a modulated illumination beam 111. Additionally, the illumination beam 111 may be delivered from the illumination source 109 via free-space propagation or guided light (e.g., an optical fiber, a light pipe, or the like).

In embodiments, the illumination source 109 directs the illumination beam 111 to the sample 104 via an illumination pathway 113. The illumination pathway 113 may include one or more illumination pathway lenses 116 or additional optical components 115 suitable for modifying and/or conditioning the illumination beam 111. For example, the one or more optical components 115 may include, but are not limited to, one or more polarizers, one or more filters, one or more beam splitters, one or more diffusers, one or more homogenizers, one or more apodizers, or one or more beam shapers.

In embodiments, the metrology sub-system 102 includes a detector 118 configured to capture photon or particle emissions from the sample 104 (e.g., a collection signal 120) through a collection pathway 122. The collection pathway 122 may include, but is not limited to, one or more collection pathway lenses 124 for directing at least a portion of the collection signal 120 to a detector 118. For example, a detector 118 may receive collected, reflected or scattered light (e.g., via specular reflection, diffuse reflection, and the like) from the sample 104 via one or more collection pathway lenses 124. By way of another example, a detector 118 may receive one or more diffracted orders of radiation from the sample 104 (e.g., 0-order diffraction, ±1 order diffraction, ±2 order diffraction, and the like). By way of another example, a detector 118 may receive radiation generated by the sample 104 (e.g., luminescence associated with absorption of the illumination beam 110, or the like).

In some embodiments, the illumination beam 111 and the collection signal 120 may go through the same objective lens. For example, the illumination pathway 111 and the collection pathway 122 may share the same objective lens.

The detector 118 may include any type of detector known in the art suitable for measuring illumination received from the sample 104. For example, a detector 118 may include, but is not limited to, a charge-coupled device (CCD) detector, a time delay integration (TDI) detector, a photomultiplier tube (PMT), an avalanche photodiode (APD), or the like. In embodiments, a detector 118 may include a spectroscopic detector suitable for identifying wavelengths of light emanating from the sample 104.

The collection pathway 122 may further include any number of collection pathway lenses 132 or collection optical elements 126 to direct and/or modify collected illumination from the sample 104 including, but not limited to, one or more filters, one or more polarizers, one or more apodizers, or one or more beam blocks.

FIG. 1C illustrates a simplified schematic view of the characterization sub-system 102 configured as an x-ray sub-system, in accordance with one or more embodiments of the present disclosure. The metrology sub-system 102 may include any type of x-ray sub-system known in the art suitable for providing an x-ray illumination beam 110 and capturing an associated collection signal 120, which may include, but is not limited to, x-ray emissions, optical emissions, or particle emissions. Examples of x-ray configurations include, but are not limited to, a small-angle x-ray scatterometer (SAXR), or a soft x-ray reflectometer (SXR).

In embodiments, the characterization sub-system 102 includes x-ray illumination pathway lenses 116 suitable for collimating or focusing an x-ray illumination beam 111 and collection pathway lenses (not shown) suitable for collecting, collimating, and/or focusing x-rays from the sample 104. For example, the metrology sub-system 102 may include, but is not limited to, x-ray collimating mirrors, specular x-ray optics such as grazing incidence ellipsoidal mirrors, polycapillary optics such as hollow capillary x-ray waveguides, multilayer optics, or systems, or any combination thereof. In embodiments, the metrology sub-system 102 includes an x-ray detector 118 such as, but not limited to, an x-ray monochromator (e.g., a crystal monochromator such as a Loxley-Tanner-Bowen monochromator, or the like), x-ray apertures, x-ray beam stops, or diffractive optics (e.g., such as zone plates).

FIG. 1D illustrates a simplified schematic view of the characterization sub-system 102 configured as a particle-beam metrology sub-system (e.g., an e-beam metrology sub-system), in accordance with one or more embodiments of the present disclosure.

In embodiments, the characterization sub-system 102 includes one or more particle focusing elements (e.g., illumination pathway lenses 116, collection pathway lenses 124 (not shown), or the like). For example, the one or more particle focusing elements may include, but are not limited to, a single particle focusing element or one or more particle focusing elements forming a compound system. Further, the one or more particle focusing elements may include any type of electron lenses known in the art including, but not limited to, electrostatic, magnetic, uni-potential, or double-potential lenses. It is noted herein that the description of a voltage contrast imaging inspection system as depicted in FIG. 1C and the associated descriptions above are provided solely for illustrative purposes and should not be interpreted as limiting. For example, the metrology sub-system 102 may include any excitation source known in the art suitable for generating inspection data on a sample 104. In embodiments, the metrology sub-system 102 includes two or more particle beam sources (e.g., electron beam sources or ion beam sources) for the generation of two or more particle beams. In embodiments, the metrology sub-system 102 includes one or more components (e.g., one or more electrodes) configured to apply one or more voltages to one or more locations of the sample 104. In this regard, the metrology sub-system 102 may generate voltage contrast imaging data.

In embodiments, the characterization sub-system 102 includes one or more particle detectors 118 to image or otherwise detect particles emanating from the sample 104. In embodiments, the one or more particle detectors 118 include an electron collector (e.g., a secondary electron collector, a backscattered electron detector, or the like). In embodiments, the one or more particle detectors 118 include a photon detector (e.g., a photodetector, an x-ray detector, a scintillating element coupled to a photomultiplier tube (PMT) detector, or the like) for detecting electrons and/or photons from the sample surface.

Some embodiments of the present disclosure are directed to providing recipes for configuring the characterization sub-system 102 to facilitate a characterization measurement. A characterization recipe may include a set of parameters for controlling various aspects of a characterization measurement such as, but not limited to, the characterization library, the illumination of a sample 104, the collection of light from the sample 104, or the position of the sample 104 during a measurement. In this way, the characterization sub-system 102 may be configured to provide a selected type of measurement for a selected metrology target design. For example, a characterization recipe may include a characterization library such as, but not limited to, a machine learning-based characterization recipe. By way of another example, a characterization recipe may include parameters of the illumination beam 110 such as, but not limited to, an illumination wavelength, an illumination pupil distribution (e.g., a distribution of illumination angles and associated intensities of illumination at those angles), a polarization of incident illumination, or a spatial distribution of illumination. By way of another example, a characterization recipe may include collection parameters such as, but not limited to, a collection pupil distribution (e.g., a desired distribution of angular light from the target to be used for a measurement and associated filtered intensities at those angles), collection field stop settings to select portions of the metrology target of interest, polarization of collected light, wavelength filters, or parameters for controlling one or more detectors. By way of another example, a characterization recipe may include various parameters associated with a design of the target such as, but not limited to, positions and orientations of sample features (e.g., pitches of grating features along particular directions). By way of a further example, a characterization recipe may include various parameters associated with the position of the sample 104 during a measurement such as, but not limited to, a sample height, a sample orientation, whether a sample 104 is static during a measurement, or whether a sample 104 is in motion during a measurement (along with associated parameters describing the speed, scan pattern, or the like).

Referring now generally to FIGS. 1A-1D, various hardware configurations may be separated into discrete operational systems or integrated within a single sub-system. For example, the metrology sub-system may combine a combination of multiple hardware configurations in a single sub-system, as generally described in U.S. Pat. No. 7,933,026 which is hereby incorporated by reference in its entirety. By way of another example, multiple metrology sub-systems may be used for measurements on a single or multiple metrology targets, as generally described in U.S. Pat. No. 7,478,019, which is incorporated herein by reference in its entirety. Various hardware configurations are generally described in U.S. Pat. Nos. 5,608,526, 5,859,424, and 6,429,943, all of which are incorporated herein by reference in their entirety.

The characterization sub-system 102 may further be configured in various hardware configurations to measure various structure and/or material characteristics of one or more layers of the sample 104 including, but not limited to, overlay, tilt, critical dimensions (CDs) of one or more structures, film thicknesses, or film compositions after one or more fabrication steps.

Figure 2:
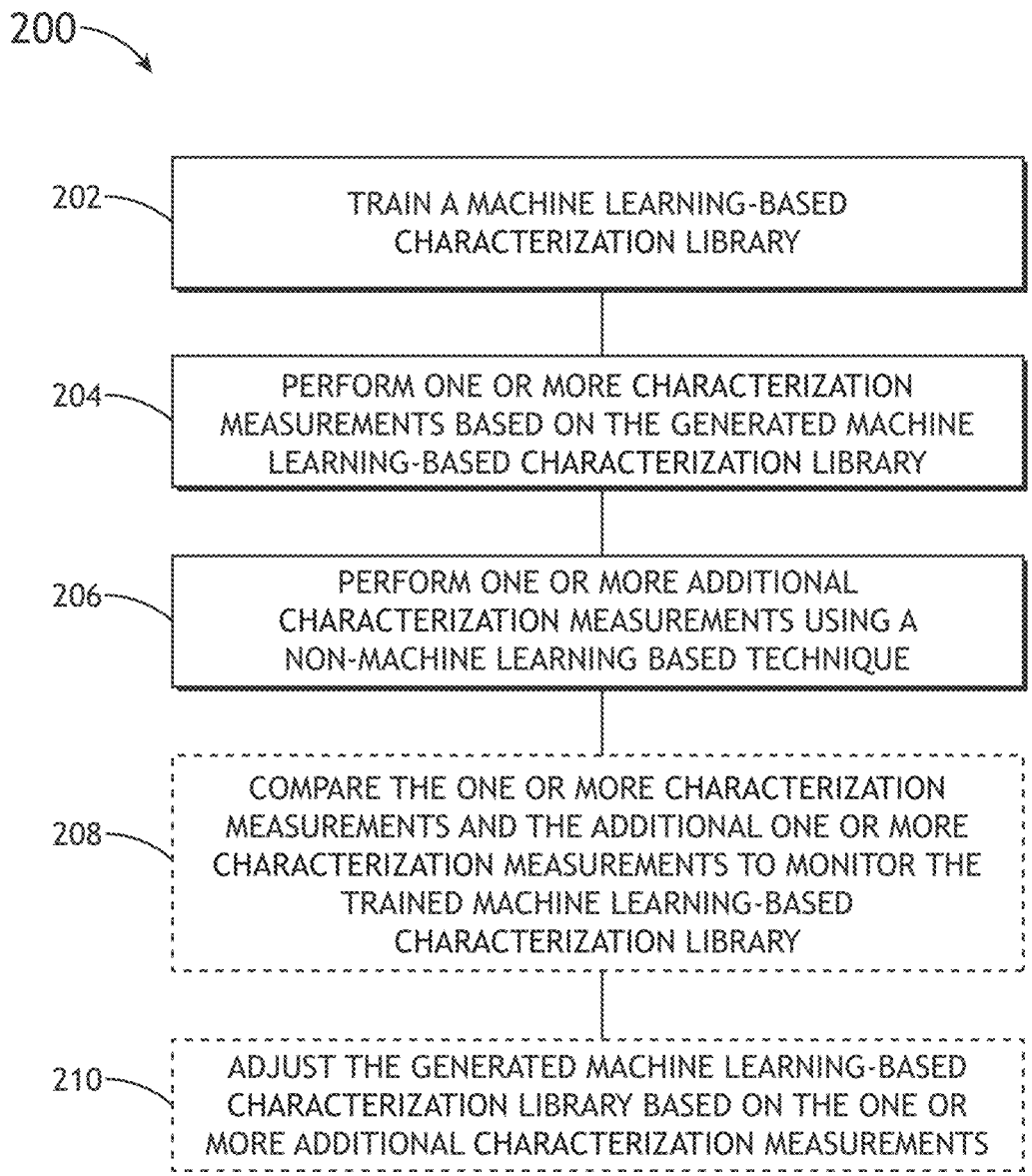
FIG. 2 illustrates a flow diagram depicting a method or process for determining measurement uncertainty, in accordance with one or more embodiments of the present disclosure.
Figure 3:
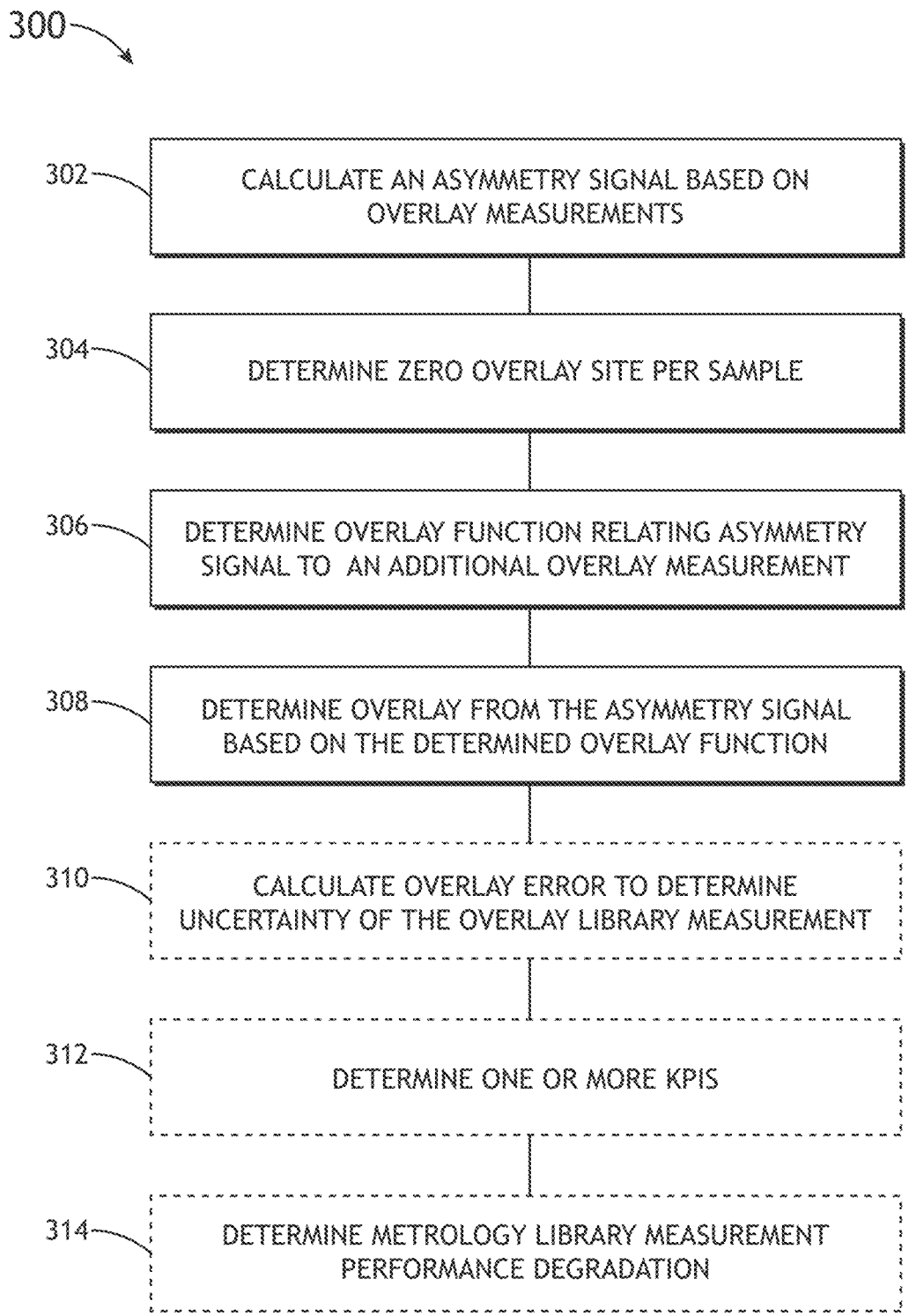
FIG. 3 illustrates a flow diagram depicting a method or process for determining overlay measurement uncertainty, in accordance with one or more embodiments of the present disclosure.
Figure 5:
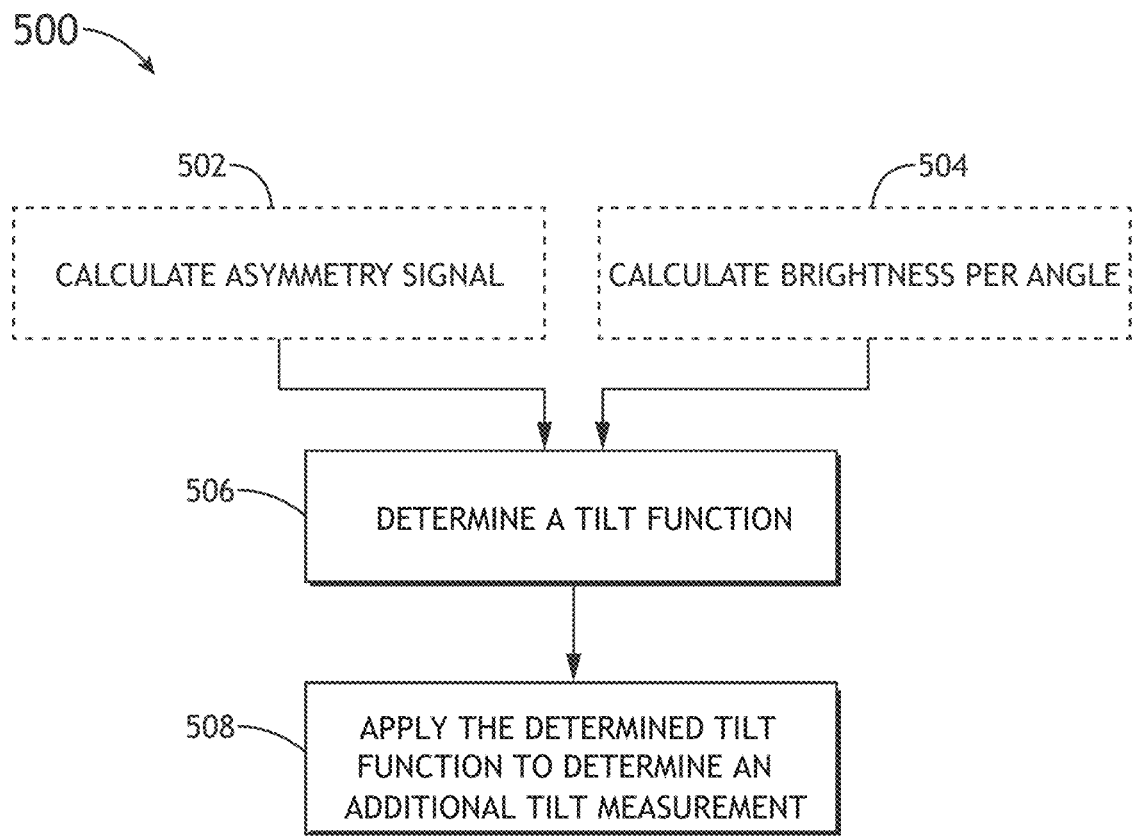
FIG. 5 illustrates a flow diagram depicting a method or process for determining tilt measurement uncertainty, in accordance with one or more embodiments of the present disclosure.

Referring now to FIGS. 2, 3, and 5 various method steps for estimating measurement uncertainty for characterization systems are described in greater detail, in accordance with one or more embodiments of the present disclosure. Applicant notes that the embodiments and enabling technologies described previously herein in the context of the overlay characterization system 100 should be interpreted to extend to the steps below. It is further noted, however, that the steps below are not limited to the architecture of the overlay characterization system 100.

FIG. 2 illustrates a flow diagram depicting a method 200 for determining measurement uncertainty for a characterization system, in accordance with one or more embodiments of the present disclosure.

In a step 202, a characterization library may be generated. For example, a machine learning-based characterization library may be generated. In embodiments, the machine learning-based characterization library includes a machine learning-based overlay measurement library. For example, the machine learning-based overlay measurement library may be generated based on a set of overlay metrology data (e.g., real data, synthetic data, reference data, and the like). In this regard, the trained machine learning-based overlay measurement library may be configured to run in-line with the overlay metrology sub-system 102 to predict overlay measurements, as discussed further herein. In embodiments, the machine learning-based characterization library includes a machine learning-based tilt measurement library. For example, the machine learning-based tilt measurement library may be generated based on a set of tilt metrology data (e.g., real data, synthetic data, reference data, and the like). In this regard, the trained machine learning-based tilt measurement library may be configured to run in-line with the x-ray metrology sub-system 102 to predict tilt measurements, as discussed further herein.

In embodiments, the machine learning-based characterization library may be generated based on one or more training datasets. In generating the machine learning-based characterization library, the system 100 may be configured to acquire one or more training images of the sample 104. For example, the controller 108 may be configured to receive training data of the sample 104 from the characterization sub-system 102. The training dataset may include, but is not limited to, data from physical samples having known characterization values, theoretical data, real-time characterization data from the physical sample, and the like. For the purposes of the present disclosure, the term "training dataset" may be regarded as data that will be used as inputs to train a machine learning algorithm of the machine learning-based characterization library.

The controller 108 may be configured to generate the machine learning-based characterization library via any techniques known in the art including, but not limited to, supervised learning, unsupervised learning, and the like. For example, in the context of supervised learning, training data may include data from physical samples having known characterization values, theoretical data, real-time characterization data from the physical sample and the like. Accordingly, the training dataset may be used as inputs to train the machine learning-based characterization library. The controller 108 may be further configured to the generated machine learning classifier in memory 112.

It is noted that the machine learning-based characterization library may include any type of machine learning algorithm and/or deep learning technique known in the art including, but not limited to, a linear model, an artificial neural network (ANN), a convolutional neural network (CNN), and the like.

In a step 204, one or more characterization measurements may be obtained using the characterization library (generated in step 202). For example, the characterization subsystem 102, in accordance with a characterization recipe, may be configured to generate one or more characterization measurements using the trained machine learning-based characterization library based on real-time characterization data associate with the one or more samples 104 from the characterization sub-system 102. In embodiments, the trained machine learning-based characterization library may be configured to run in-line with the characterization sub-system 102 to predict one or more characterization measurements. For example, the controller 108 may be configured to receive real-time characterization data from the characterization sub-system 102 to generate a characterization value using the trained machine learning-based characterization library.

In embodiments, the characterization sub-system 102 may include an overlay metrology sub-system 102 configured to generate one or more overlay measurements. For example, the overlay metrology sub-system 102 may be configured to determine overlay by obtaining spectra using metrology sub-system 102 and using the trained machine learning-based metrology library (generated in step 202) to generate the overlay value.

In embodiments, the characterization sub-system 102 may include an x-ray metrology sub-system 102 configured to generate one or more tilt measurements. For example, the x-ray metrology sub-system 102 may be configured to determine tilt by obtaining spectra using the metrology sub-system 102 and using the train machine learning-based metrology library (generated in step 202) to generate the tilt value.

In a step 206, an additional characterization measurement may be generated using a non-machine learning-based technique. For example, an overlay measurement may be generated based on an asymmetry signal (as discussed further with respect to FIG. 3). For instance, a ground truth may be based on the asymmetry signal and used as the monitor of the measurement uncertainty of the machine learning-based technique of the machine learning-based overlay library. By way of another example, an angular tilt measurement may be generated based on an asymmetry signal or brightness value per angle (as discussed further with respect to FIG. 5). For instance, a ground truth may be based on the asymmetry signal or brightness per angle and used as the monitor of the measurement uncertainty of the machine learning-based technique of the machine learning-based tilt library.

In a step 208, the additional characterization measurement (generated in step 206) may be compared to the characterization measurement (generated in step 204) to monitor the measurement uncertainty of the trained machine learning-based characterization library (generated in step 202). For example, the overlay measurement based on the asymmetry signal may be compared to the overlay measurement based on the machine learning-based overlay library to identify measurement deviations, measurement errors, measurement uncertainty, and the like, or a combination thereof. By way of another example, the tilt measurement based on the asymmetry signal/brightness per angle may be compared to the tilt measurement based on the machine learning-based tilt library to identify measurement deviations, measurement errors, measurement uncertainty, and the like, or a combination thereof.

In an optional step 210, the machine learning-based library is adjusted based on the generated additional characterization measurement (generated in step 206 using on a non-machine learning-based technique). For example, the machine learning-based overlay library may be adjusted based on the generated additional characterization measurement. For instance, the machine learning-based overlay library (or recipe) may be retrained based on the generated additional characterization measurement. By way of another example, the machine learning-based tilt library may be adjusted based on the generated additional angular tilt measurement (generated in step 206 using a non-machine learning-based technique). For instance, the machine learning-based tilt library may be retrained based on the generated additional tilt measurement.

It is contemplated that the additional characterization measurement generated in step 206 may be generated periodically to monitor the measurement uncertainty of the machine learning-based characterization library. In this regard, the system may be configured to periodically check the machine learning-based characterization library to determine if the machine learning-based characterization library needs to be adjusted (or optimized).

FIG. 3 depicts a flowchart depicting a method or process 300 for generating an additional overlay measurement based on a non-machine learning-based technique, in accordance with one or more embodiments of the present disclosure.

In a step 302, an asymmetry signal may be calculated. For example, an asymmetry signal may be calculated based on Mueller components. For instance, the asymmetry signal may be calculated based on signal selection of off diagonal Mueller elements on the wavelength range that are sensitive to overlay variation only.

By way of another example, an asymmetry signal may be calculated based on different azimuth angles. For instance, the asymmetry signal may be calculated based on a signal combination (e.g., square of sum, sum, or principal component) of a differential signal between opposite azimuth angles (e.g., AZ180–AZ0) over wavelength regions that are sensitive to the overlay.

In a step 304, a zero overlay site per sample may be determined based on the calculated asymmetry signal. For example, the zero overlay site may be determined for each sample (e.g., wafer) based on where the asymmetry signal becomes zero. For instance, the zero overlay site may be determined by determining where on each sample the actual overlay on the sample is zero. In this regard, the asymmetry signal is zero when the actual overlay is zero, such that this asymmetry signal may be the basis of a ground truth.

In a step 306, an overlay function relating the asymmetry signal to an additional overlay measurement may be determined. For example, the overlay function may be shown and described by Equation 1 below:

$$OVL2 = f(AsymSignal) \qquad \text{EQN. 1}$$

where $OVL2 = 0$ when $AsymSignal = 0$

In a step 308, the determined overlay function may be applied to each site of the sample to determine the additional overlay measurement. For example, the additional overlay measurement may be determined using linear transformation. For instance, the asymmetry signal map may be linear transformed using Equation 1, such that the standard deviation (STD) of the residual signal is identical to the expected standard deviation of the overlay within the sample (e.g., wafer). In this regard, the OVL2 is forced to be zero when the asymmetry signal is zero and further forced to have the expected standard deviation of overlay across the sample. It is noted that the standard deviation of the asymmetry signal may not match the expected overlay standard deviation. Further it is noted that the overlay calculated from the asymmetry signal may not suffer from extrapolation robustness issues, because it is anchored by the zero asymmetry. This allows the system to detect shifts in the main overlay library performance due to extrapolation robustness issues.

It is noted that the system and method may use any type of non-machine learning-based technique to derive the additional overlay measurement. The above example is provided merely for illustrative purposes and shall not be construed as limiting the scope of the present disclosure.

In an optional step 310, an overlay error may be calculated based on the calculated overlay (from step 308) to determine an overlay library measurement uncertainty. For example, the calculated overlay (from step 308) may be used as ground truth. The overlay error may be determined based on the difference between the overlay calculated in step 204 (OVL) and overlay based on the asymmetry signal calculated in step 308 (OVL2), as shown below in Equation 2:

$$OVL\ Error = OVL - OVL2 \qquad EQN.\ 2$$

In an additional/optional step 312, one or more key performance indicators (KPIs) may be defined to monitor process shifts. For example, as previously discussed herein, when the process change is significant, the existing machine learning-based characterization recipe may not be robust on extrapolation data set. It is critical to determine when the machine learning-based characterization recipe suffers robustness issue. Once the additional overlay measure (OVL2) is obtained for each sample (e.g., wafer), various sample (e.g., wafer) level metrics may be defined to detect process excursion and to trigger to refresh existing machine learning-based recipes running inline. In one instance, KPIs may be defined at sample level to monitor process shifts including, but not limited to, correlation (R2), slope, offset between calibrated overlay from asymmetry signal and overlay prediction from the existing machine learning-based characterization recipe, zero overlay points error (e.g., overlay prediction at zero overlay site determined from asymmetry signal), and the like.

In another instance, KPIs may be defined at the site level and used for recipe optimization to decide which machine learning-based library is more robust. Site level KPIS may be determined based on Equation 3, shown and described below:

$$Site\ Level\ KPI = |Calibrated\ OVL\ at\ site\ i - \qquad EQN.\ 3$$
$$OVL\ prediction\ from\ existing\ recipe\ at\ site\ i|$$

Figure 4:
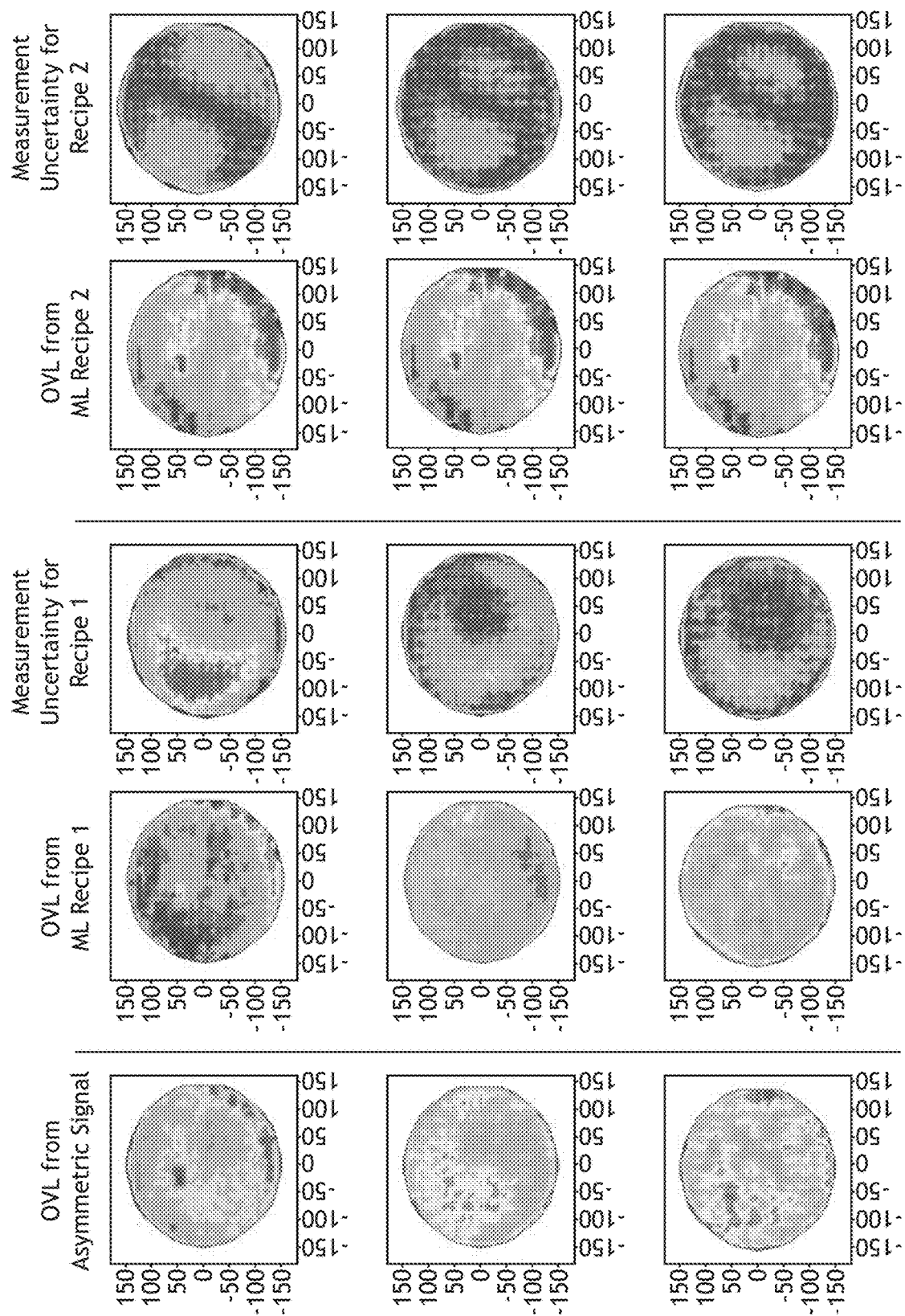
FIG. 4 illustrates a plurality of overlay measurement uncertainty maps for a plurality of machine learning-based overlay recipes, in accordance with one or more embodiments of the present disclosure.

FIG. 4 illustrates a plurality of overlay measurement uncertainty maps for a plurality of machine learning-based overlay recipes, in accordance with one or more embodiments of the present disclosure. In embodiments, the measurement uncertainty maps may be generated by subtracting the overlay from the asymmetric signal (OVL2) and the overlay from machine learning-based recipe (OVL).

As shown in FIG. 4, measurement uncertainty maps for different machine learning-based recipes may be analyzed to determine which machine learning-based recipe may be more robust. For example, the overlay calculated from the asymmetric signal may be used to compare different machine learning-based recipes to determine which one has more uncertainty or is the more robust recipe. As shown in FIG. 4, recipe 2 has much larger uncertainty and is less robust than recipe 1.

Referring again to FIG. 3, in an additional/optional step 314, characterization library measurement performance degradation may be determined. For example, the machine learning-based library measurement performance degradation (uncreased uncertainty) may be determined using the mean and sigma of the error across the sample (calculated in step 310).

FIG. 5 depicts a flowchart depicting a method or process 500 for generating an additional angular tilt measurement based on a non-machine learning-based technique, in accordance with one or more embodiments of the present disclosure.

Figure 6A:
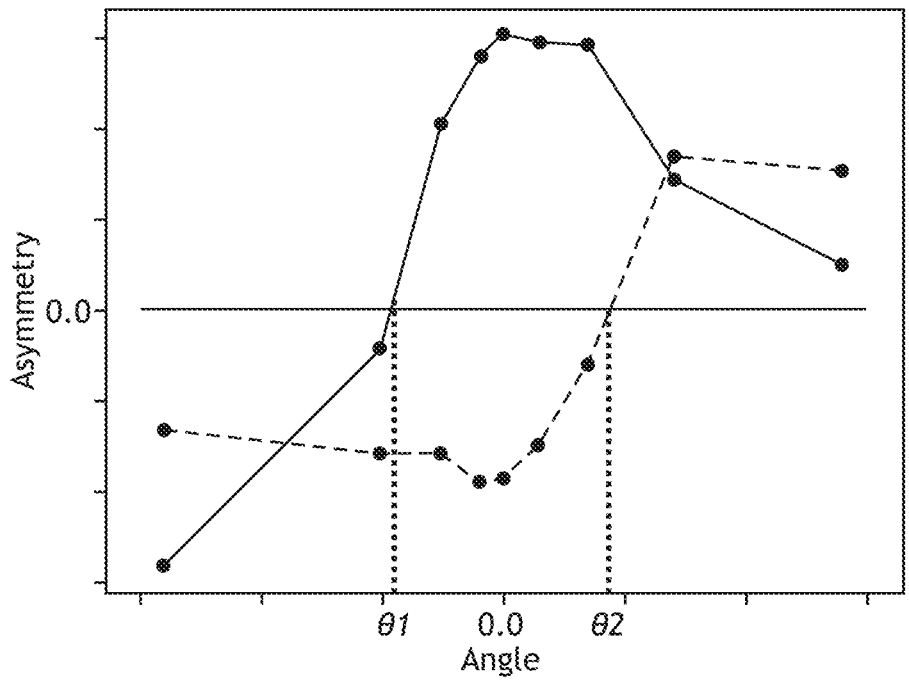
FIG. 6A illustrates a plot depicting asymmetry signal per angle, in accordance with one or more embodiments of the present disclosure.

In an optional step 502, an asymmetry signal may be calculated. For example, as shown in FIG. 6A, the asymmetry signal may be calculated based on the difference of integrated intensity between the left and right part of the image for each angular position based on a plot 600. For instance, a scatter x-ray intensity from the x-ray characterization sub-system 102 may be integrated within region of interest for each angular position and used to calculate the asymmetric signal.

Figure 6B:
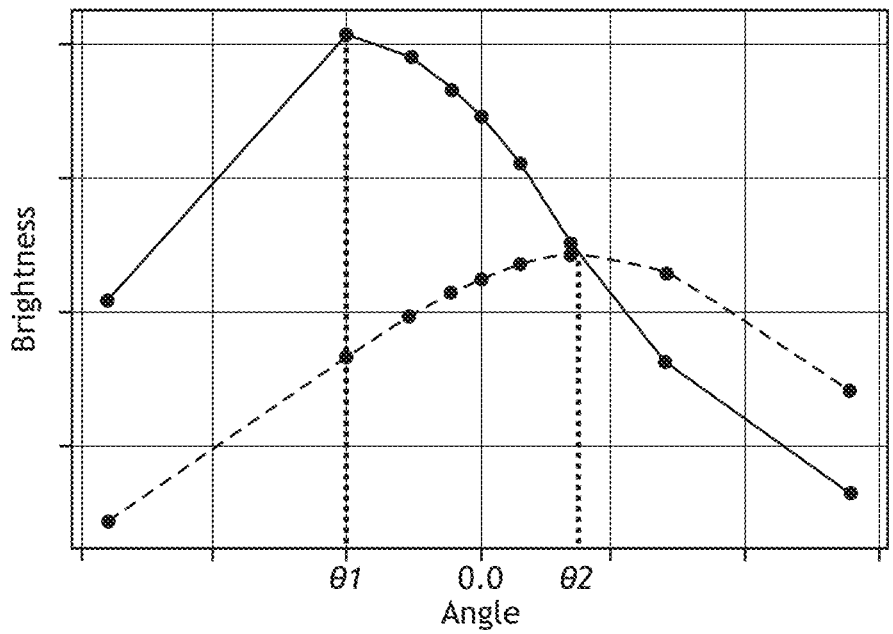
FIG. 6B illustrates a plot depicting brightness per angle, in accordance with one or more embodiments of the present disclosure.

In an optional step 504, a brightness per angle may be calculated. For example, as shown in FIG. 6B, the asymmetric signal may be calculated based brightness per angular position based on a plot 610. For instance, a scatter x-ray intensity from the x-ray characterization sub-system 102 may be integrated within region of interest for each angular position and used to calculate the brightness per angle.

In a step 506, a tilt function relating one of the asymmetry signal or the brightness per angle to an additional tilt measurement may be determined. For example, where the asymmetry signal is determined (step 502), the most symmetric image may be obtained when the asymmetry signal is zero. In this regard, the corresponding angle of incidence at zero asymmetry may be considered ground truth and used to measure angular tilt.

By way of another example, where brightness per angle is calculated (step 504), the brightest image may be obtained as the maximum in the integrated scattered x-ray intensity. For instance, at each angle, the scattered x-ray intensity of the x-ray scattering image from the x-ray characterization sub-system 102 may be integrated. In this regard, as shown in FIG. 6B, the integrated intensity (as brightness of the image) may be nonlinear along an angle with an empirical peak function and the angular position for the maximum in the scattered intensity may be directly correlated to the tilt measurement.

In a step 508, the determined tilt function may be applied to determine the additional tilt measurement. For example, the tilt function may be considered as ground truth and used to measurement tilt uncertainty for the tilt machine learning-based tilt library. By way of another example, the tilt function may be used to decide which machine learning library is more robust.

Referring again to FIG. 1A, additional components of the characterization system 100 are described in greater detail, in accordance with one or more embodiments of the present disclosure.

In embodiments, the characterization system 100 includes a controller 128 communicatively coupled to the characterization sub-system 102 and/or any components therein. In embodiments, the controller 128 includes one or more processors 130. For example, the one or more processors 130 may be configured to execute a set of program instructions maintained in a memory device 132 (or memory). The one or more processors 130 of a controller 128 may include any processing element known in the art. In this sense, the one or more processors 130 may include any microprocessor-type device configured to execute algorithms and/or instructions.

The one or more processors 130 of a controller 128 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 130 may include any device configured to execute algorithms and/or instructions (e.g., program instructions stored in memory). In embodiments, the one or more processors 130 may be embodied as a desktop computer, mainframe computer system, workstation, image computer, parallel processor, networked computer, or any other computer system configured to execute a program configured to operate or operate in conjunction with the characterization system 100, as described throughout the present disclosure. Moreover, different subsystems of the characterization system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 128 may include one or more controllers housed in a common housing or within multiple housings. In this way, any controller or combination of controllers may be separately packaged as a module suitable for integration into the characterization system 100.

The memory device 132 may include any storage medium known in the art suitable for storing program instructions executable by the associated one or more processors 130. For example, the memory device 132 may include a non-transitory memory medium. By way of another example, the memory device 132 may include, but is not limited to, a read-only memory (ROM), a random-access memory (RAM), a magnetic or optical memory device (e.g., disk), a magnetic tape, a solid-state drive and the like. It is further noted that the memory device 132 may be housed in a common controller housing with the one or more processors 130. In embodiments, the memory device 132 may be located remotely with respect to the physical location of the one or more processors 130 and the controller 128. For instance, the one or more processors 130 of the controller 128 may access a remote memory (e.g., server), accessible through a network (e.g., internet, intranet and the like).

The controller 128 may direct (e.g., through control signals) or receive data from the characterization sub-system 102 or any components therein. The controller 128 may further be configured to perform any of the various process steps described throughout the present disclosure.

In embodiments, the memory device 132 includes a data server. For example, the data server may collect data from the characterization sub-system 102 or other external sub-systems associated with the characterization targets at any processing step or steps (e.g., ADI steps, AEI steps, ACI steps, or the like). The data server may also store training data associated with training or otherwise generating a characterization recipe (e.g., overlay recipe or tilt recipe). The controller 128 may then utilize any such data to create, update, retrain, or modify characterization recipes (e.g., machine learning characterization recipes) used to generate characterization measurements using characterization data from the device targets.

In embodiments, the characterization system 100 includes a user interface 134 communicatively coupled to the controller 128. In embodiments, the user interface 134 may include, but is not limited to, one or more desktops, laptops, tablets, and the like. In embodiments, the user interface 134 includes a display used to display data of the characterization system 100 to a user. The display of the user interface 134 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 134 is suitable for implementation in the present disclosure. In embodiments, a user may input selections and/or instructions responsive to data displayed to the user via a user input device of the user interface 134.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random-access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A characterization system, the characterization system comprising:
    one or more controllers including one or more processors configured to execute a set of program instructions stored in memory, the set of program instructions configured to cause the one or more processors to:
        train a machine learning-based characterization library based on a set of training data, the set of training data including at least known characterization data associated with one or more samples, theoretical characterization data, and real-time characterization data associated with the one or more samples from a characterization sub-system;
        generate one or more characterization measurements using the trained machine learning-based characterization library based on the real-time characterization data associated with the one or more samples from the characterization sub-system;
        determine one or more additional characterization measurements based on a non-machine learning-based technique, the non-machine learning-based technique configured to determine the one or more additional characterization measurements based on the real-time characterization data from the characterization sub-system or additional real-time characterization data from an additional characterization sub-system, wherein determining the one or more additional characterization measurements based on the non-machine learning-based technique comprises: (i) calculating an asymmetry signal for each sample, (ii) determining a zero overlay site per sample based on where the asymmetry signal is zero, (iii) determining an overlay function relating the calculated asymmetry signal to an additional overlay measurement, wherein the overlay function is constrained such that the additional overlay measurement is zero when the asymmetry signal is zero and the standard deviation of the additional overlay measurement across the sample matches an expected standard deviation of overlay, and (iv) applying the determined overlay function to each site of the sample to determine the additional overlay measurement; and compare the one or more characterization measurements based on the generated machine learning-based characterization library and the one or more additional characterization measurements based on the non-machine learning-based technique to monitor a measurement uncertainty of the machine learning-based characterization library.

2. The system of claim 1, wherein the set of program instructions are further configured to cause the one or more processors to:
adjust the generated machine learning-based characterization library based on the comparison of the one or more characterization measurements and the one or more additional characterization measurements.

3. The system of claim 1, wherein the machine learning-based characterization library includes a machine learning-based overlay measurement library.

4. The system of claim 1, wherein the machine learning-based characterization library includes a machine learning-based angular tilt measurement library.

5. The system of claim 1, wherein the one or more characterization measurements includes one or more overlay metrology measurements.

6. The system of claim 1, wherein the one or more characterization measurements includes one or more angular tilt metrology measurements.

7. The system of claim 1, wherein the determine one or more additional characterization measurements based on a non-machine learning-based technique further comprises:
calculating an asymmetry signal;
determining a zero overlay site per sample based on the calculated asymmetry signal;
determining an overlay function relating the calculated asymmetry signal to an additional overlay measurement;
determining the additional overlay measurement by applying the determined overlay function to the sample; and
calculating an overlay error value based on the one or more characterization measurements and the additional overlay measurements.

8. The system of claim 7, wherein the calculating an asymmetry signal comprises:
calculating the asymmetry signal based on Mueller components.

9. The system of claim 7, wherein the calculating an asymmetry signal comprises:
calculating the asymmetry signal based on opposite azimuth angles.

10. The system of claim 7, wherein the compare the one or more characterization measurements based on the generated machine learning-based characterization library and the one or more additional characterization measurements based on the non-machine learning-based technique to monitor a measurement uncertainty of the machine learning-based characterization library further comprises:
defining one or more key performance indicators at one of a sample level or a site level.

11. The system of claim 7, wherein the compare the one or more characterization measurements based on the generated machine learning-based characterization library and the one or more additional characterization measurements based on the non-machine learning-based technique to monitor a measurement uncertainty of the machine learning-based characterization library further comprises:
determining a measurement performance degradation for the machine learning-based characterization library using one of a mean of the calculated overlay error across the sample or a sigma of the calculated overlay error across the sample.

12. The system of claim 1, wherein the determine one or more additional characterization measurements based on a non-machine learning-based technique further comprises:
calculating an asymmetry signal;
determining a tilt function relating the calculated asymmetry signal to an additional tilt measurement; and
determining the additional tilt measurement by applying the determined tilt function to the sample.

13. The system of claim 1, wherein the determine one or more additional characterization measurements based on a non-machine learning-based technique further comprises:
calculating a brightness per angle;
determining a tilt function relating the calculated brightness per angle to an additional tilt measurement; and
determining the additional tilt measurement by applying the determined tilt function to the sample.

14. A characterization system, the characterization system comprising:
a characterization sub-system configured to obtain real-time characterization data of one or more samples; and
one or more controllers including one or more processors configured to execute a set of program instructions stored in memory, the set of program instructions configured to cause the one or more processors to:
train a machine learning-based characterization library based on a set of training data, the set of training data including at least known characterization data associated with the one or more samples, theoretical characterization data, and the real-time characterization data associated with the one or more samples from the characterization sub-system;
generate one or more characterization measurements using the trained machine learning-based characterization library based on the real-time characterization data associated with the one or more samples from the characterization sub-system;
determine one or more additional characterization measurements based on a non-machine learning-based technique, the non-machine learning-based technique configured to determine the one or more additional characterization measurements based on the real-time characterization data from the characterization sub-system or additional real-time characterization data from an additional characterization sub-system, wherein determining the one or more additional characterization measurements based on the non-machine learning-based technique comprises: (i) calculating an asymmetry signal for each sample, (ii) determining a zero overlay site per sample based on where the asymmetry signal is zero, (iii) determining an overlay function relating the calculated asymmetry signal to an additional overlay measurement, wherein the overlay function is constrained such that the additional overlay measurement is zero when the asymmetry signal is zero and the standard deviation of the additional overlay measurement across the sample matches an expected standard deviation of overlay, and (iv) applying the determined overlay function to each site of the sample to determine the additional overlay measurement; and
compare the one or more characterization measurements based on the generated machine learning-based characterization library and the one or more additional characterization measurements based on the non-machine learning-based technique to monitor a measurement uncertainty of the machine learning-based characterization library.

15. The system of claim 14, wherein the set of program instructions are further configured to cause the one or more processors to:
adjust the generated machine learning-based characterization library based on the comparison of the one or more characterization measurements and the one or more additional characterization measurements.

16. The system of claim 14, wherein the characterization sub-system includes an overlay metrology sub-system.

17. The system of claim 16, wherein the machine learning-based characterization library includes a machine learning-based overlay measurement library.

18. The system of claim 16, wherein the determine one or more additional characterization measurements based on a non-machine learning-based technique further comprises:
calculating an asymmetry signal;
determining a zero overlay site per sample based on the calculated asymmetry signal;
determining an overlay function relating the calculated asymmetry signal to an additional overlay measurement;
determining the additional overlay measurement by applying the determined overlay function to the sample; and
calculating an overlay error value based on the one or more characterization measurements and the additional overlay measurement.

19. The system of claim 18, wherein the calculating an asymmetry signal comprises:
calculating the asymmetry signal based on Mueller components.

20. The system of claim 18, wherein the calculating an asymmetry signal comprises:
calculating the asymmetry signal based on opposite azimuth angles.

21. The system of claim 18, wherein the compare the one or more characterization measurements based on the generated machine learning-based characterization library and the one or more additional characterization measurements based on the non-machine learning-based technique to monitor a measurement uncertainty of the machine learning-based characterization library further comprises:
defining one or more key performance indicators at one of a sample level or a site level.

22. The system of claim 18, wherein the compare the one or more characterization measurements based on the generated machine learning-based characterization library and the one or more additional characterization measurements based on the non-machine learning-based technique to monitor a measurement uncertainty of the machine learning-based characterization library further comprises:
determining a measurement performance degradation for the machine learning-based characterization library using one of a mean of the calculated overlay error across the sample or a sigma of the calculated overlay error across the sample.

23. The system of claim 14, wherein the characterization sub-system includes an x-ray metrology sub-system.

24. The system of claim 23, wherein the machine learning-based characterization library includes a machine learning-based angular tilt measurement library.

25. The system of claim 23, wherein the determine one or more additional characterization measurements based on a non-machine learning-based technique further comprises:
calculating an asymmetry signal; and
determining a tilt function relating the calculated asymmetry signal to an additional tilt measurement; and
determining the additional tilt measurement by applying the determined tilt function to the sample.

26. The system of claim 23, wherein the determine one or more additional characterization measurements based on a non-machine learning-based technique further comprises:
calculating a brightness per angle; and
determining a tilt function relating the calculated brightness per angle to an additional tilt measurement; and
determining the additional tilt measurement by applying the determined tilt function to the sample.

27. A method, the method comprising:
training a machine learning-based characterization library based on a set of training data, the set of training data including at least known characterization data associated with one or more samples, theoretical characterization data, and real-time characterization data associated with the one or more samples from a characterization sub-system;
generating one or more characterization measurements using the trained machine learning-based characterization library based on the real-time characterization data associated with the one or more samples from the characterization sub-system;
determining one or more additional characterization measurements based on a non-machine learning-based technique, the non-machine learning-based technique configured to determine the one or more additional characterization measurements based on the real-time characterization data from the characterization sub-system or additional real-time characterization data from an additional characterization sub-system, wherein determining the one or more additional characterization measurements based on the non-machine learning-based technique comprises: (i) calculating an asymmetry signal for each sample, (ii) determining a zero overlay site per sample based on where the asymmetry signal is zero, (iii) determining an overlay function relating the calculated asymmetry signal to an additional overlay measurement, wherein the overlay function is constrained such that the additional overlay measurement is zero when the asymmetry signal is zero and the standard deviation of the additional overlay measurement across the sample matches an expected standard deviation of overlay, and (iv) applying the determined overlay function to each site of the sample to determine the additional overlay measurement; and
comparing the one or more characterization measurements based on the generated machine learning-based characterization library and the one or more additional characterization measurements based on the non-machine learning-based technique to monitor a measurement uncertainty of the machine learning-based characterization library.

28. The method of claim 27, further comprising:
adjusting the generated machine learning-based characterization library based on the comparison of the one or more characterization measurements and the one or more additional characterization measurements.

29. The method of claim 27, wherein the determining one or more additional characterization measurements based on a non-machine learning-based technique further comprises:

calculating an asymmetry signal;
determining a zero overlay site per sample based on the calculated asymmetry signal;
determining an overlay function relating the calculated asymmetry signal to an additional overlay measurement;
determining the additional overlay measurement by applying the determined overlay function to the sample; and
calculating an overlay error value based on the obtained one or more characterization measurements and the additional overlay measurement.

30. The method of claim 27, wherein the determining one or more additional characterization measurements based on a non-machine learning-based technique further comprises:
calculating an asymmetry signal;
determining a tilt function relating the asymmetry signal to an additional tilt measurement; and
determining the additional tilt measurement by applying the determined tilt function to the sample.

31. The method of claim 27, wherein the determining one or more additional characterization measurements based on a non-machine learning-based technique further comprises:
calculating a brightness per angle;
determining a tilt function relating the calculated brightness per angle to an additional tilt measurement; and
determining the additional tilt measurement by applying the determined tilt function to the sample.

* * * * *